(12) United States Patent
Hayashi

(10) Patent No.: US 6,236,356 B1
(45) Date of Patent: May 22, 2001

(54) POSITION MEASURING SYSTEM, POSITION MEASURING UNIT, AND POSITION MEASURING METHOD

(75) Inventor: Nobuyuki Hayashi, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/283,085

(22) Filed: Mar. 31, 1999

(30) Foreign Application Priority Data

Apr. 3, 1998 (JP) .................................................. 10-091582

(51) Int. Cl.[7] .............................. G01S 5/02; H04B 7/185
(52) U.S. Cl. .............................. 342/357.08; 342/357.01; 342/357.06; 342/357.1
(58) Field of Search ........................ 342/357.01–357.17; 244/3.14

(56) References Cited

U.S. PATENT DOCUMENTS

| 5,202,829 | * | 4/1993 | Geier ........................... 342/357.08 X |
| 5,344,105 | * | 9/1994 | Youhanaie ......................... 244/3.14 |
| 5,689,269 | * | 11/1997 | Norris ............................. 342/357.08 |
| 5,781,150 | * | 7/1998 | Norris ............................. 342/357.08 |
| 5,952,959 | * | 9/1999 | Norris ............................. 342/357.08 |

FOREIGN PATENT DOCUMENTS

2213339 * 8/1989 (GB) .

* cited by examiner

Primary Examiner—Bernarr E. Gregory
(74) Attorney, Agent, or Firm—Jay H. Maioli

(57) ABSTRACT

In a first position measuring unit, a selecting portion selects radio waves containing available position measured information from a plurality of satellites through an antenna. A communicating portion communicates with a second position measuring unit. The first and second position measuring units select radio waves that can be shared therewith. The first and second position measuring units measure their positions using the same set of the selected radio waves. Measured results of the second position measuring unit are transmitted to the first position measuring unit. A calculating portion of the first position measuring unit calculates a relative distance between the first and second position measuring units corresponding to the difference between the measured results of the first and second position measuring units.

2 Claims, 5 Drawing Sheets

POSITION MEASURING SYSTEM, POSITION MEASURING UNIT, AND POSITION MEASURING METHOD

BACKGROUND OF THE INVENTION

1. Field of the Invention

The present invention relates to a position measuring system for accurately measuring the distances among a plurality of GPS (Global Positioning System) receiving units using radio waves of position measured information received from satellites.

2. Description of the Related Art

Position information systems that inform their users of their positions using GPS have become common. In the GPS, spectrum spread signals of ephemeris data and almanac data are received from several to a dozen satellites. Corresponding to the received data and signals, position information (latitude and longitude) is obtained. Almanac data is used to determine radio waves of satellites that a GPS receiving unit can acquire. Ephemeris data is accurate position information of a satellite and is used to obtain the distance between the GPS receiving unit and a satellite.

The GPS receiving unit receives data from for example three satellites and calculates pseudo-distances to the satellites corresponding to time periods after data is transmitted from the satellites until the data is received. In addition, the GPS receiving unit receives data from another (fourth) satellite, corrects errors of the pseudo-distances, and obtains the current position of the GPS receiving unit.

When the distances among a plurality of GPS receiving units are calculated using such a system, the measuring accuracy is important. Examples of deterioration factors of the measuring accuracy are the performance of the GPS receiving unit and spatial delays of radio waves received from satellites. In addition, since the system was developed for military use, as another deterioration factor, there is intentional deterioration of position measured information.

Such deterioration factors cause position measurement errors of as large as several 10 meters. In addition, the magnitudes and patterns of position measurement errors depend on the types of transmitting units. Thus, the receiving unit side cannot predict position measurement errors.

To solve such a problem, a base station whose coordinates are known receives position measured information from a transmitting unit. By comparing the measured result with the coordinates of the base station, a position measurement error on a transmitting unit side is calculated. FIG. 1 shows a method for measuring a position measurement error on a base station side. Referring to FIG. 1, a base station E has a GPS receiving unit. The coordinates of the position of the base station E are known. The base station E receives radio waves from satellites A, B, C, and D. The distance between each of the satellites A, B, C, and D and the base station E is obtained using the received radio waves. By comparing the measured values with the coordinates of the position of the base station E, errors $\Delta A$, $\Delta B$, $\Delta C$, and $\Delta D$ of the satellites A, B, C, and D are obtained. When the position of the base station E is actually measured, the errors $\Delta A$, $\Delta B$, $\Delta C$, and $\Delta D$ are added to the position measured information of the satellites A, B, C, and D, respectively.

In the GPS, a system that calculates errors and provides compensation information using FM radio waves has been practically used. With such a system, the user can obtain accurate position measured information.

However, in such a system, when the user's position is out of the service area of the system, he or she cannot use the service.

When the user uses the service, he or she requires complicated hardware. Occasionally, the user should pay subscription fee for the service. Thus, the user's cost becomes high. Moreover, other position calculation radio wave transmission systems other than GPS do not have such a service.

On the other hand, when the relative distances among a plurality of receiving units are required, the accuracies of absolute position information of the receiving units are not important as long as the accuracies of the distances among the receiving units satisfy a predetermined level. Thus, the conventional systems cannot satisfy such requirements.

In addition, to stably accomplish such a function, the accuracy should be maintained in a particular level anywhere. However, in the conventional systems, since satellites used for measuring the user's position are changed from time to time, it is difficult to maintain the particular level of accuracy.

OBJECTS AND SUMMARY OF THE INVENTION

An object of the present invention is to provide a position measuring system, a position measuring unit, and a position measuring method that allow relative positions of a plurality of GPS receiving units to be stably and accurately obtained regardless of the position of a user.

The present invention is a position measuring system for measuring a current position using position measured information received from satellites, comprising a plurality of position measuring means for measuring respective current positions using measured information received from the same set of satellites, wherein the distances among said plurality of position measuring means are obtained by calculating the differences among the measured results of said plurality of measuring means.

As described above, according to the present invention, the relative positions among a plurality of position measuring means are measured with position measured information received from the same set of satellites. The differences among the measured results of the plurality of position measuring means are obtained. Thus, by canceling errors contained in the position measured information, the relative distances among the plurality of position measuring means can be obtained.

These and other objects, features and advantages of the present invention will become more apparent in light of the following detailed description of a best mode embodiment thereof, as illustrated in the accompanying drawings.

DETAILED DESCRIPTION OF THE PREFERRED EMBODIMENT

Next, an embodiment of the present invention will be described. According to the present invention, a plurality of position measuring units having respective GPS receiving units receive radio waves from the same set of satellites. Thus, the position measurement errors of the position measuring units become almost the same. Consequently, the relative positions among the position measuring units can be accurately obtained.

Figure 1:
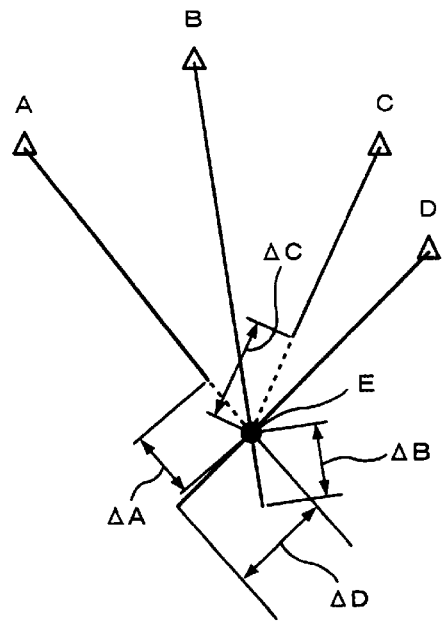
FIG. 1 is a schematic diagram showing a method for measuring position measurement errors of satellites on a base station side.
Figure 2:
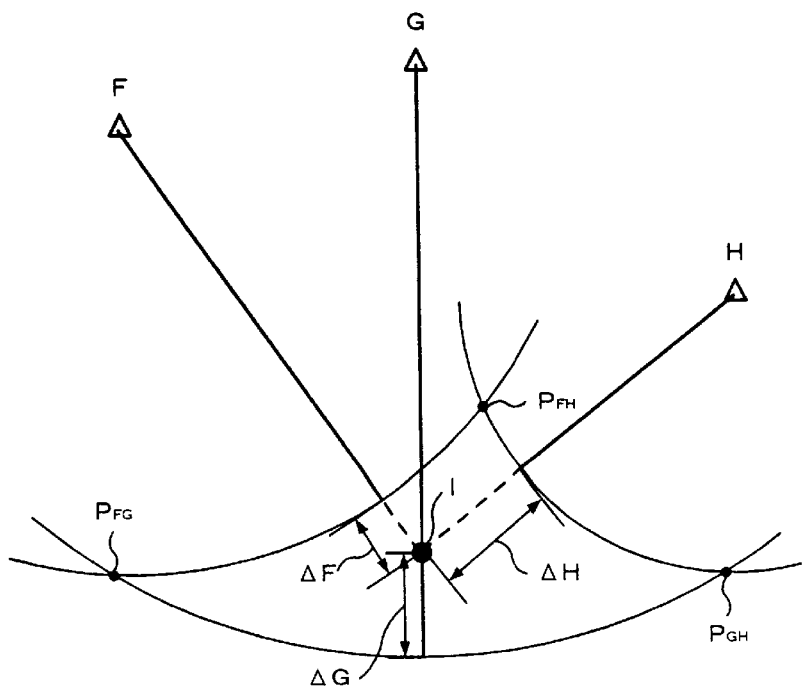
FIG. 2 is a schematic diagram showing a process for receiving radio waves from three satellites, measuring distances to the satellites, and two-dimensionally calculating coordinates of position I.

FIG. 2 shows a process for receiving radio waves from three transmitting units F, G, and H, measuring the distances to the transmitting units F, G, and H, and two-dimensionally calculating the coordinates of position I. When radio waves are received from the transmitting units, information of radio wave transmission sources and information of radio wave transmission time are obtained. By multiplying the difference between the transmitted time of each radio wave and the received time of each radio wave at the position I by light velocity c, the distance between the relevant transmitting unit and the position I can be obtained.

The distance calculated results corresponding to radio waves received from the three transmitting units F, G, and H contain different errors $\Delta F$, $\Delta G$, and $\Delta H$. In the example, since the position I is two-dimensionally measured, the number of radio waves necessary for calculating the position I is two. However, the measured results largely vary depending on the selection of radio waves such as $P_{FG}$, $P_{GH}$, and $P_{FH}$.

Next, the influence of the distance calculated results against two position measuring units spaced by distance r will be described. In the case of GPS, a transmitting unit is place at an altitude of around 20,000 km. Thus, the angle $\theta$ between the transmitting unit and each position measuring unit can be approximately expressed as follows:

$$\theta = \tan(r/R) \qquad (1)$$

where R is the distance between the transmitting unit and each position measuring unit.

The distance R between the transmitting unit and each position measuring unit is much larger than distance r between the position measuring units. Thus, even if the distance between the position measuring units is 100 km, the angle $\theta$ is as small as 0.0005°. In other words, the error of the distance between the position measuring units is reversely proportional to the distance between the transmitting unit and each position measuring unit.

According to the present invention, measured errors of radio waves received by a plurality of position measuring units are canceled using such a characteristic. Thus, the distances among a plurality of position measuring units can be accurately measured. In a system of which the distance between a transmitting unit and each position measuring unit is sufficiently larger than the distance between each position measuring unit, all the position measuring units perform position measurement calculations using the same set of radio waves.

Thus, errors of position measured results of different transmitting units become the same in all the position measuring units. With the difference between the positions measured by the position measuring units, the errors of the measured results can be minimized.

Next, an example of a position measurement calculation according to the embodiment of the present invention will be described. It is assumed that the position of position measuring unit S that is an unknown is expressed as coordinates $(x_0, y_0, z_0)$. In addition, it is assumed that the position of i-th satellite of a plurality of satellites that is a known is expressed as coordinates $(x_i, y_i, z_i)$ containing an error component $e_i$ (that will be described later).

The distance between the position measuring unit S and the i-th satellite can be obtained by formula (2) corresponding to the Pythagorean theorem.

$$\sqrt{(x_i - x_0)^2 + (y_i - y_0)^2 + (z_i - z_0)^2} + e_i = c \cdot (dT_i - dt) \qquad (2)$$

where $dT_i$: measured radio wave propagation time period of i-th satellite, dt: time deviation of position measuring unit (when measured time delays from correct time, dt is positive), c: light velocity, $e_i$: error component contained in position measured information received from i-th satellite. Error component $e_i$ is composed of for example a delay of propagation of a radio wave transmitted from a satellite or an error of satellite position information.

Assuming that the distance between the position measuring unit S and the i-th satellite is expressed as $r_{0i}$, the right side of formula (2) can be expressed as follows:

$$cdT_i = r_i, \; cdt = s \qquad (3)$$

where $r_i$: pseudo-distance, and s: amount of influence of clock error of position measuring unit against distance.

The pseudo distance $r_i$ is the distance between the i-th satellite and the position measuring unit S as is clear from formula (2).

With formulas (2) and (3), the pseudo distance $r_i$ obtained as measured results can be expressed by formula (4):

$$r_i = \sqrt{(x_i - x_0)^2 + (y_i - y_0)^2 + (z_i - z_0)^2} - s + e_i \qquad (4)$$

For four satellites used to measure positions of the position measuring unit S, pseudo distances $r_i$ thereof are measured. The obtained pseudo distances $r_i$ are substituted into formula (4). Thus, four formulas corresponding to the four satellites are obtained. Consequently, four unknowns ($x_0$, $y_0$, $z_0$, s) can be obtained. It should be noted that the number of satellites used to measure positions of position measuring units may be four or more.

Now, it is assumed that two position measuring units $S_1$ and $S_2$ placed at positions A and B acquire radio waves of satellites, respectively. The position calculated result at the position A can be expressed as follows:

$$A(x, y, z) = (X_a + e_{xa}, Y_a + e_{ya}, Z_a + e_{za}) \qquad (5)$$

where ($e_{xa}$, $e_{ya}$, $e_{za}$) are errors caused by $e_i$ at the position A.

Likewise, the position calculated result at the position B can be expressed as follows:

$$B(x, y, z) = (x_b + e_{xb}, y_b + e_{yb}, Z_b + e_{zb}) \qquad (6)$$

where as with the case of the position A, ($e_{xb}$, $e_{yb}$, $e_{zb}$) are errors caused by $e_i$ at the position B.

On the other hand, as was described above with formula (1), it seems that the error component $e_1$ contained in satellite information is almost the same in each position measuring unit. Thus, the errors contained in the position calculated results using the same set of satellites are almost the same in each of a plurality of position measuring units as expressed by formula (7).

$$e_{xa} \cong e_{xb}$$
$$e_{ya} \cong e_{yb}$$
$$e_{sa} \cong e_{sb} \tag{7}$$

As described above, the distance r between the position A and the position B can be obtained by the difference between formula (5) and formula (6) as expressed by formula (8).

$$r = \sqrt{(x_b - x_a + e_{xb} - e_{xa})^2 + (y_b - y_a + e_{yb} - e_{ya})^2 + (z_b - z_a + e_{sb} - e_{za})^2} \tag{8}$$

With formula (7) and formula (8), it is clear that the error component of each satellite contained in the measured result is almost canceled with respect to the distance r. Thus, using the position measuring method according to the present invention, the distance between position measuring units placed at positions A and B can be accurately obtained.

Figure 3:
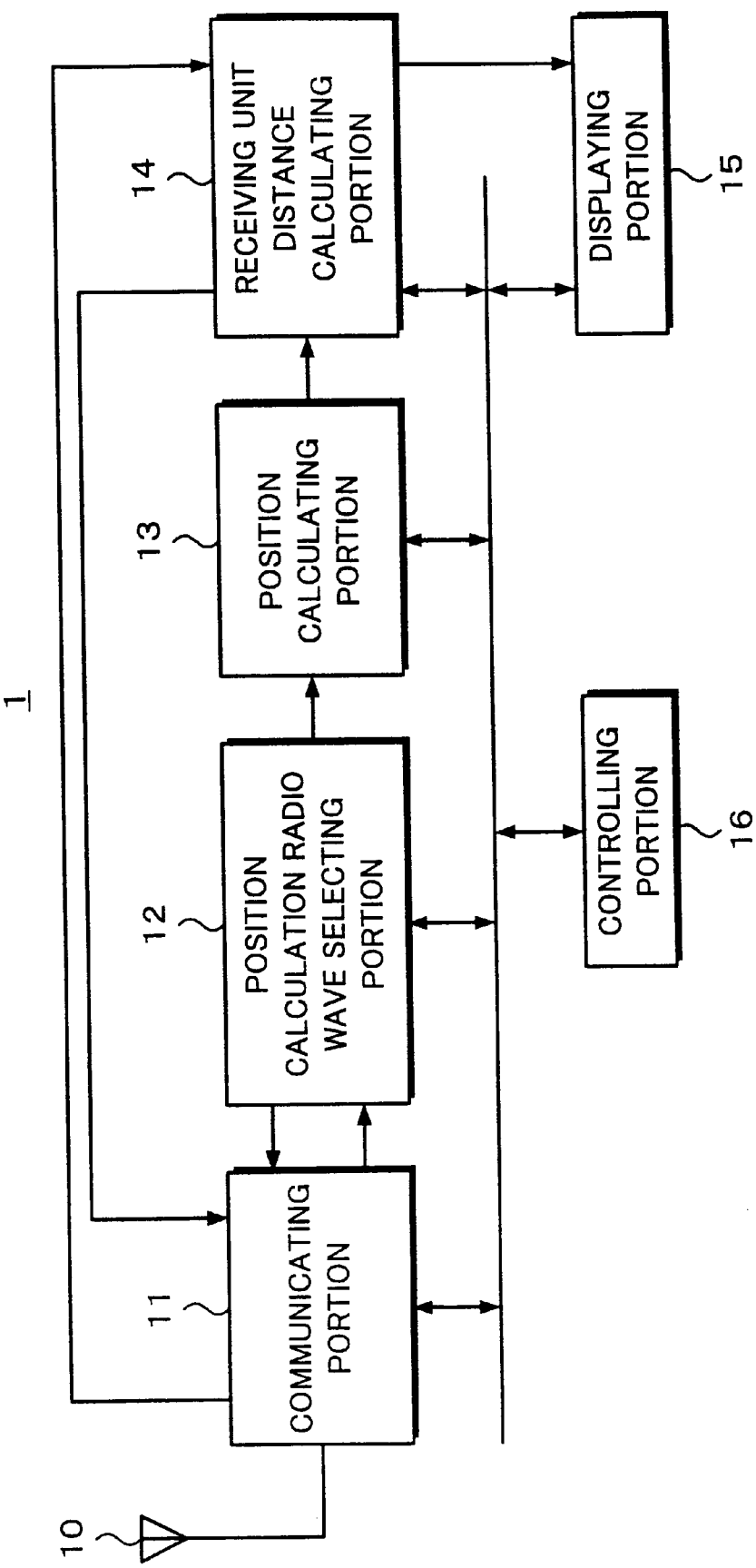
FIG. 3 is a block diagram showing an example of the structure of a position measuring apparatus according to the present invention.
Figure 4:
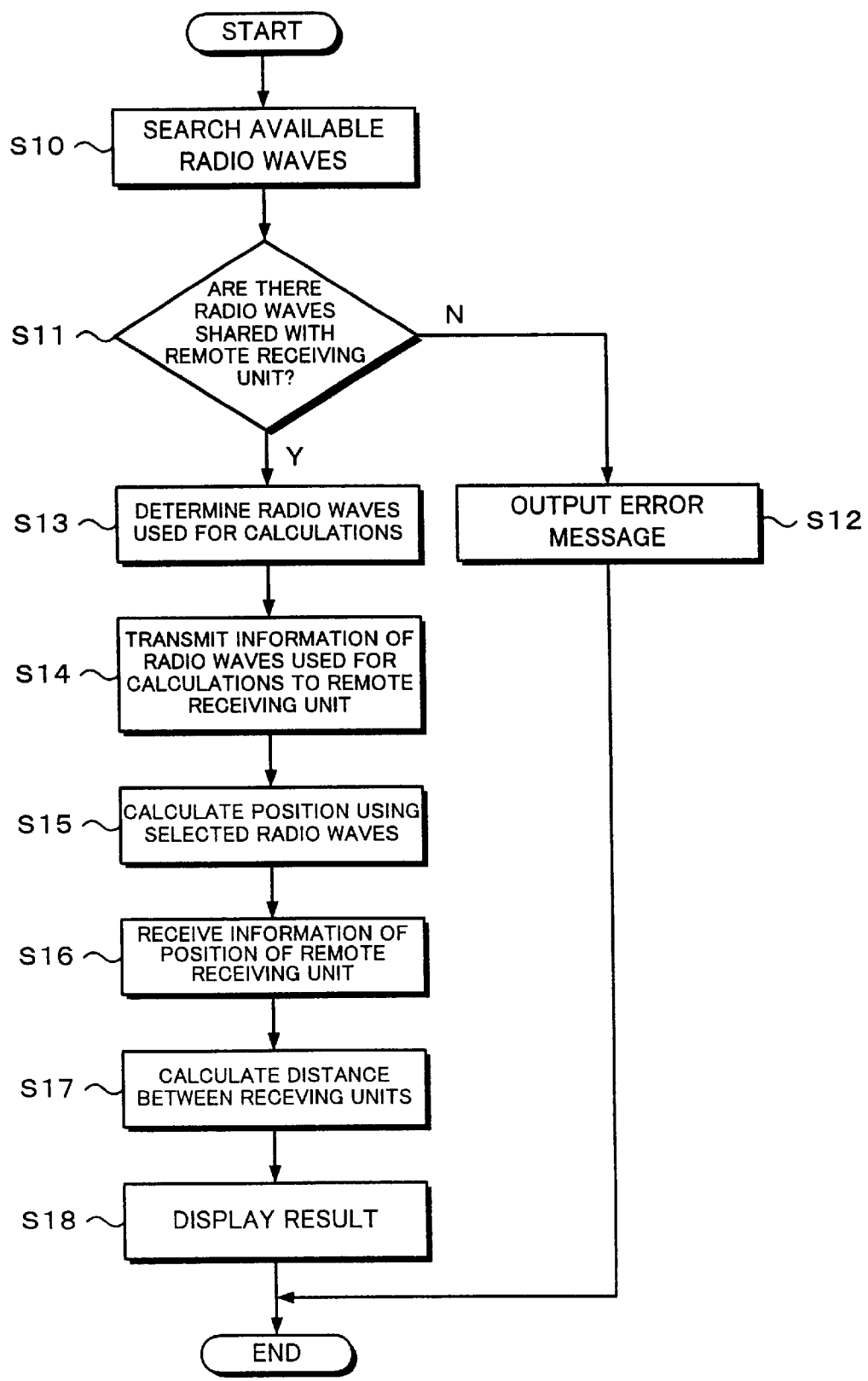
FIG. 4 is a flow chart showing an example of a position measurement calculating process according to the present invention.

FIG. 3 is a block diagram showing the structure of a position measuring unit according to the embodiment of the present invention. FIG. 4 is a flow chart showing a position measurement calculating process according to the embodiment of the present invention. Next, with reference to FIGS. 3 and 4, the position measuring unit and the position measurement calculating process according to the embodiment of the present invention will be described.

In FIG. 3, a position measuring unit 1 comprises an antenna 10, a communicating portion 11, position calculation radio wave selecting portion 12, a position calculating portion 13, a receiving unit distance calculating portion 14, a displaying portion 15, and a controlling portion 16. As described above, when positions are measured according to the present invention, a plurality of position measuring units 1 are used. In this example, the position measuring unit 1 and a position measuring unit 1' that are placed at positions A and B, respectively, are used.

The antenna 10 and the communicating portion 11 are used in common with a transmitting process and a receiving process. For example, the antenna 10 and the communicating portion 11 receive radio waves from GPS satellites and transmit/receive signals to/from the other position measuring unit 1'. The communicating portion 11, the position calculation radio wave selecting portion 12, the position calculating portion 13, the receiving unit distance calculating portion 14 are controlled by a controlling portion 16. The controlling portion 16 comprises a CPU, a RAM, and a ROM.

In FIG. 4, at step S10, the antenna 10 and the communicating portion 11 receive radio waves from GPS satellites. The position measuring unit 1 searches radio waves that can be used for a position measurement calculation. When the position measuring unit 1 can acquire radio waves of for example four or more satellites, the flow advances to step S11.

At step S11, the position measuring unit 1 communicates with the remote position measuring unit 1' and obtains radio wave information representing radio waves that the remote position measuring unit 1' can use from those acquired by the position measuring unit 1. The position measuring unit 1' determines whether or not to acquire the same radio waves as the position measuring unit 1 corresponding to satellite information received therefrom. The position measuring unit 1' transmits the determined result to the position measuring unit 1.

When the remote position measuring unit 1' cannot use radio waves, cannot acquire the same radio waves as the position measuring unit 1, or cannot acquire a predetermined number of radio waves, the flow advances to step S12. At step S12, the controlling portion 16 outputs an error message that represents that the position measuring process cannot be performed to the displaying portion 15 and completes the position measuring process.

On the other hand, when the number of radio waves shared by the position measuring unit 1 and the position measuring unit 1' exceeds a predetermined value, the flow advances to step S13. At step S13, the position calculation radio wave selecting portion 12 of the position measuring unit 1 selects radio waves used for the position measurement calculation. In this example, the position measuring unit 1 selects radio waves in the order of the highest reception condition. Alternatively, the position measuring unit 1 may receive information of radio wave reception condition from the position measuring unit 1' and determines radio waves used for the position measuring process corresponding to the information received from the position measuring unit 1' and the reception condition of the position measuring unit 1.

When the position measuring unit 1 has determined radio waves used for the position measuring process, the position measuring unit 1 transmits information of the determined radio waves to the remote position measuring unit 1' (at step S14). The controlling portion 16 of the remote position measuring unit 1' sets the communicating portion 11 corresponding to the received information so as to receive radio waves from the same set of satellites as the position measuring unit 1.

At step S15, the position measurement calculations are performed with the selected radio waves. In other words, the selected radio waves are supplied to the communicating portion 11 through the antenna 10. The communicating portion 11 demodulates the selected radio waves and supplies the demodulated signals to the position calculating portion 13. The position calculating portion 13 performs calculations for obtaining formula (5) with position information of relevant satellites, transmission time information of the radio waves, and current time information at the position A.

Likewise, the position measuring unit 1' placed at the position B receives radio waves from the same set of satellites as the position measuring unit 1, performs position measurement calculations for obtaining formula (6), and transmits the calculated results to the position measuring unit 1.

After the position measuring units 1 and 1' have performed position measurement calculations at the positions A and B, the flow advances to step S16. At step S16, the position measuring unit 1 receives the calculated results from the remote position measuring unit 1'. The calculated results at the position B are supplied to the receiving unit distance calculating portion 14.

At step S17, the receiving unit distance calculating portion 14 calculates formula (8) and the distance between the position A and the position B. The calculated results are displayed on the displaying portion 15 (at step S18).

In the position measuring unit 1, part of the communicating portion 11 and the controlling portion 16 may be always placed in idle state. When the position measuring unit 1 receives a particular signal from the remote position measuring unit 1', all the position measuring unit 1 may be placed in active state. In this case, even if the position measuring unit 1' is an unattended unit, the position measuring unit 1 can measure the distance to the position measuring unit 1'.

Figure 5:
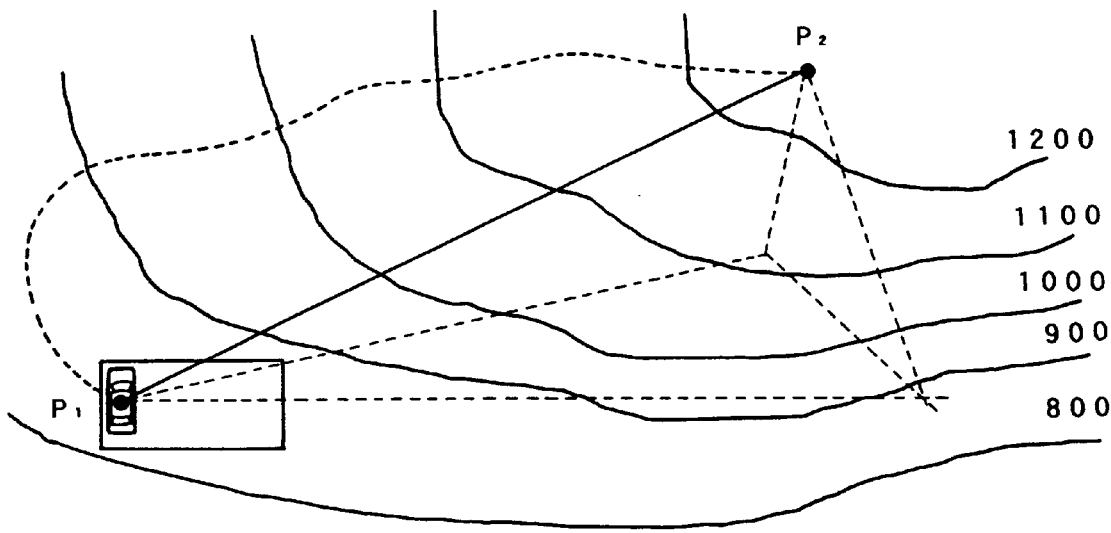
FIG. 5 is a schematic diagram showing a position measuring method according to the present invention applied to mountain climbing.

Next, applications of the present invention will be described. FIG. 5 shows a position measuring process according to the present invention applied to mountain climbing. The user goes to a starting point $P_1$ of a mountain by car. The user climbs up the mountain on foot. The coordinates and altitude of the starting point $P_1$ are normally described on a map. The above-described position measuring unit 1' according to the present invention is disposed in the car parked at the starting point $P_1$. The user carries the above-described position measuring unit 1. When the position of the user is $P_2$, he or she can obtain the relative position to the car having the position measuring unit 1. Thus, the user can accurately know the coordinates and altitude of his or her current position. Consequently, the user can safely climb up the mountain free of mis-course.

Figure 6:
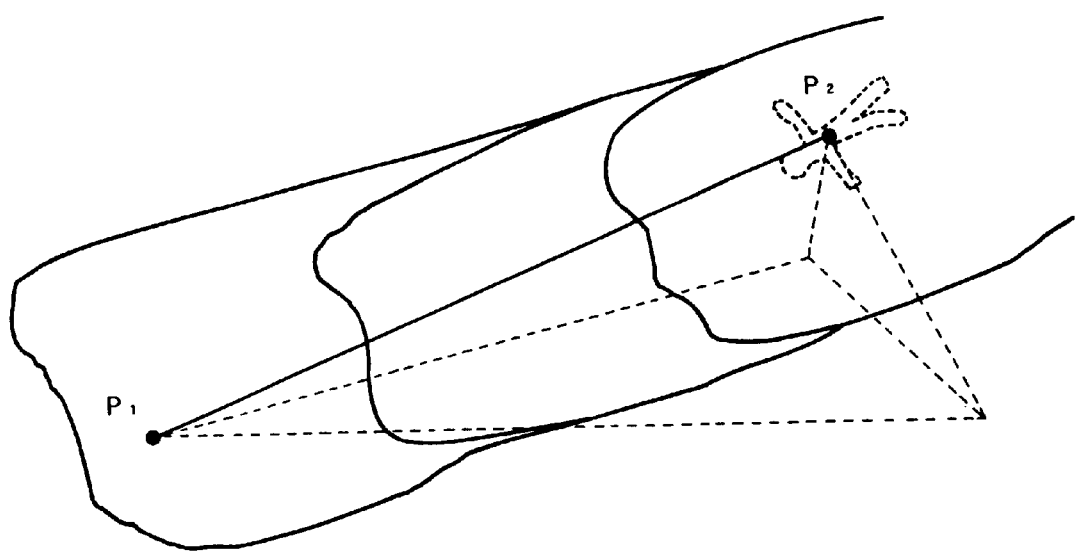
FIG. 6 is a schematic diagram showing a position measuring method according to the present invention applied to a snowslide rescue activity.

FIG. 6 shows a position measuring method according to the present invention applied to a snowslide rescue activity. When the user meets with a snowslide, a delay of the rescue activity is fatal. Conventionally, with a beacon or the like, a transmission source is detected. However, in this method, to find a person buried in snow, experience and know how are required.

When the user with the position measuring unit 1' according to the present invention climbs up a snow mountain, even if he or she meets with a snowslide and is buried in snow at the position $P_2$, a rescuer $P_1$ with the position measuring unit 1 according to the present invention can accurately obtain the distance and direction to the user. The direction can be obtained by detecting the variation of the distance between the rescuer $P_1$ and the position $P_2$. Thus, the rescuer $P_1$ can quickly perform a rescue activity. The present invention can be effectively applied to various types of rescue activities.

Figure 7:
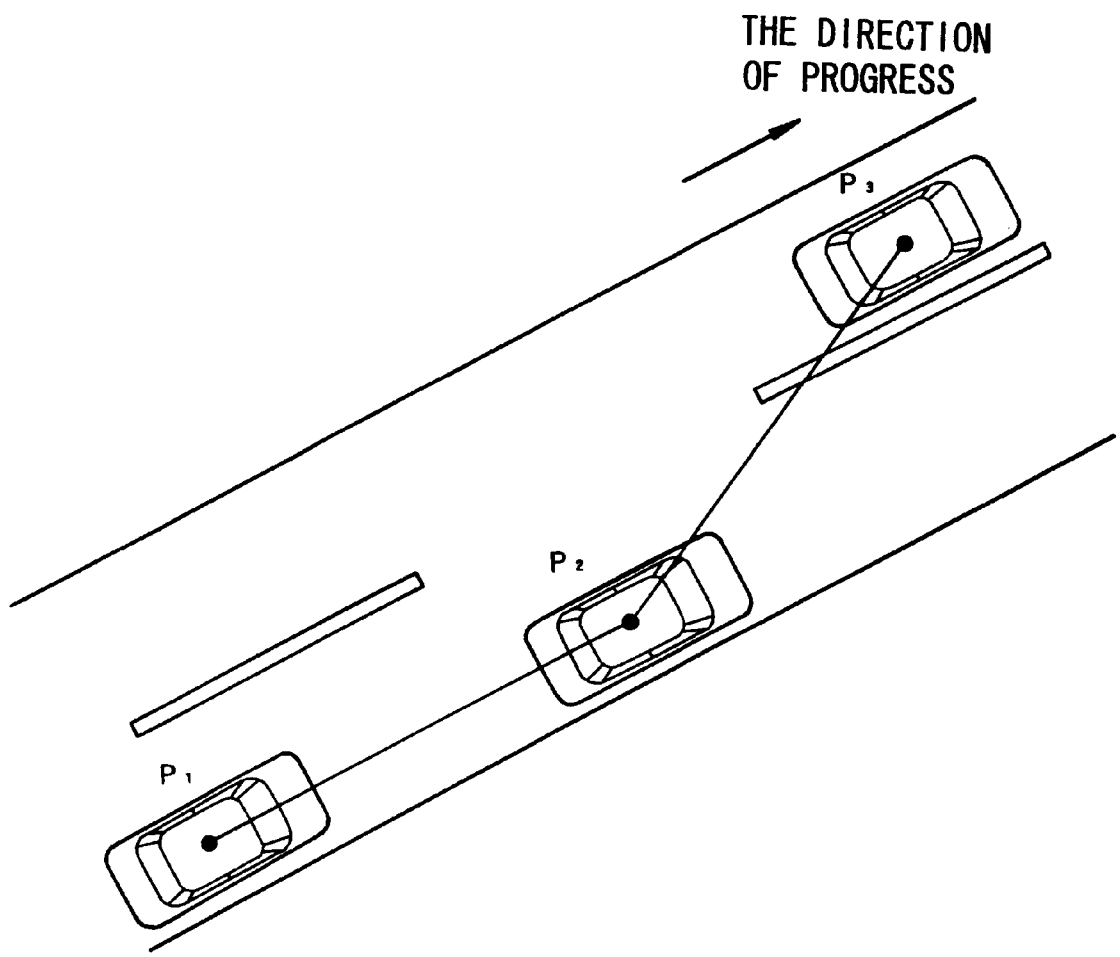
FIG. 7 is a schematic diagram showing a position measuring method according to the present invention applied to a formation of a plurality of cars.

FIG. 7 shows a position measuring method according to the present invention applied to a formation of a plurality of cars $P_1$, $P_2$, and $P_3$. The cars $P_1$, $P_2$, and $P_3$ are equipped with the respective position measuring units 1. When the car $P_2$ monitors the relative distances with the cars $P_1$ and $P_3$ that run before and after the car $P_2$, a car distance alarm function and an automatic velocity controlling function can be easily accomplished. In a large parking, one car equipped with the position measuring unit 1 can easily reach another car equipped with the position measuring unit 1.

As described above, according to the present invention, since a plurality of measuring units measure relative positions using the same set of satellites, errors of distances due to the satellites are canceled. Thus, the relative distance between two points can be accurately obtained.

In addition, according to the present invention, since one of a plurality of position measuring units is disposed at a position whose coordinates are known, a relative position of another position measuring unit can be accurately and easily measured.

Moreover, according to the present invention, a person, a substance, a car, and so forth equipped with the position measuring units can be quickly found.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A position measuring system for measuring a relative position between first and second receiving units using position measured information received from a plurality of satellites, comprising:

first and second position measuring means included in said first and second receiving units, respectively, for measuring respective first and second current positions of said first and second position measuring means using said position measured information received from a same set of satellites selected from said plurality of satellites, wherein said first and second receiving units search for available satellites and communicate with each other a result of this search, based on said result said same set of satellites is selected and an error message is output when said same set of satellites cannot be selected, and wherein said relative position between said first and second receiving units is obtained by calculating differences between said results measured by said first and second position measuring means.

2. A position measuring unit for measuring a distance from a remote position measuring unit using position measured information received from a plurality of satellites, comprising:

communicating means for enabling communication with said remote position measuring unit, wherein said remote position measuring unit includes first position measuring means, second position measuring means for measuring said distance from said remote position measuring unit using said positioned measured information received from a same set of satellites selected from said plurality of satellites, wherein said first position measuring means of said remote position measuring unit and said second position measuring means of said position measuring unit search for available satellites and communicate with each other using said communicating means a result of this search, based on said result said same set of satellites is selected and an error message is output when said same set of satellites cannot be selected; and distance calculating means for calculating said distance from said remote position measuring unit by calculating differences between measurements determined by said first and second position measuring means shared by a communication between said position measuring unit and said remote position measuring unit using said communicating means.

* * * * *